(12) United States Patent
Ferrer Carrera et al.

(10) Patent No.: US 11,692,275 B2
(45) Date of Patent: Jul. 4, 2023

(54) CORROSION CONTROL COMPOSITIONS AND METHODS OF MITIGATING CORROSION

(71) Applicant: ECOLAB USA INC., St. Paul, MN (US)

(72) Inventors: Ana Ferrer Carrera, Missouri City, TX (US); Yolanda Maria De-Abreu, Katy, TX (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 17/173,063

(22) Filed: Feb. 10, 2021

(65) Prior Publication Data

US 2021/0269924 A1 Sep. 2, 2021

Related U.S. Application Data

(60) Provisional application No. 62/983,409, filed on Feb. 28, 2020.

(51) Int. Cl.
*C23F 11/167* (2006.01)
*C23F 11/18* (2006.01)
(Continued)

(52) U.S. Cl.
CPC ............ *C23F 11/1676* (2013.01); *C09K 8/54* (2013.01); *C23F 11/184* (2013.01);
(Continued)

(58) Field of Classification Search
CPC ......... C23F 11/08; C23F 11/10; C23F 11/167; C23F 11/1676; C23F 11/18; C23F 11/184;
(Continued)

(56) References Cited

U.S. PATENT DOCUMENTS

| | | | | |
|---|---|---|---|---|
| 4,606,890 A | * | 8/1986 | Fisk | ................... C23F 11/1676 252/389.52 |
| 4,689,200 A | * | 8/1987 | Cook | ....................... C02F 5/14 252/389.23 |

(Continued)

FOREIGN PATENT DOCUMENTS

| | | |
|---|---|---|
| CN | 105645611 A | 6/2016 |
| CN | 110803781 A | 2/2020 |

(Continued)

OTHER PUBLICATIONS

PCT International Search Report and Written Opinion for PCT/US2021/017500, dated May 28, 2021, 14 pages.

*Primary Examiner* — Matthew R Diaz
(74) *Attorney, Agent, or Firm* — Eric D. Babych; Barnes & Thornburg LLP (57) ABSTRACT

Corrosion inhibitor compositions are provided that can include a mixture of one or more alkaline earth metals, one or more organic phosphates, one or more inorganic phosphates, optionally a dispersant, and hydroxyphosphono acetic acid and/or salts thereof and/or derivatives of hydroxyphosphono acetic acid and/or salts thereof. Methods of mitigating or inhibiting corrosion of metal surfaces are also disclosed. The methods can include the steps of adding a corrosion inhibitor composition as described in the present disclosure to a medium in contact with the metal surface and optionally to the metal surface before it is contacted by the medium.

10 Claims, 3 Drawing Sheets

(51) Int. Cl.
*H04L 5/00* (2006.01)
*H04W 72/0446* (2023.01)
*H04W 72/1263* (2023.01)
*H04W 72/21* (2023.01)
*C09K 8/54* (2006.01)

(52) U.S. Cl.
CPC ....... *H04L 5/0053* (2013.01); *H04W 72/0446* (2013.01); *H04W 72/1263* (2013.01); *H04W 72/21* (2023.01); *C09K 2208/32* (2013.01)

(58) Field of Classification Search
CPC ....... C23F 11/187; C23F 11/188; C23F 11/04; C23F 11/06; C02F 5/08; C02F 5/10; C02F 5/14; C02F 5/145; C08K 8/54; C08K 2208/32
USPC ............. 252/387, 388, 389.1, 389.2, 389.23, 252/389.61
See application file for complete search history.

(56) References Cited

U.S. PATENT DOCUMENTS

| | | | | |
|---|---|---|---|---|
| 5,294,371 | A | * | 3/1994 | Clubley ................. C23F 11/167 252/389.23 |
| 6,585,933 | B1 | | 7/2003 | Ehrhardt et al. |
| 8,617,415 | B2 | * | 12/2013 | Yang ....................... C23F 11/08 252/75 |
| 9,175,405 | B2 | * | 11/2015 | Gill ....................... C23F 11/1676 |
| 2014/0272133 | A1 | | 9/2014 | Gill et al. |
| 2016/0257868 | A1 | * | 9/2016 | Yang ....................... C23F 11/188 |
| 2017/0306506 | A1 | * | 10/2017 | Drewniak ........... C23F 11/1676 |

FOREIGN PATENT DOCUMENTS

| | | |
|---|---|---|
| EP | 0544345 A1 | 6/1993 |
| WO | 2019005429 A1 | 1/2019 |

\* cited by examiner

CORROSION CONTROL COMPOSITIONS AND METHODS OF MITIGATING CORROSION

BACKGROUND OF THE INVENTION

1. Field of the Invention

The disclosure pertains to compositions and methods useful for controlling corrosion. In particular, the disclosure pertains to corrosion control compositions and methods of mitigating corrosion of metals in corrosive systems.

2. Description of the Related Art

Corrosion of metal surfaces in aqueous media has long been a problem for industries, such as the oil and gas, food and beverage, washing/sanitizing industries. For example, it is well known that during the production of oil and gas, several corrosive components are present, such as brines, organic acids, carbon dioxide, hydrogen sulfide, and microorganisms. These aggressive constituents can cause severe corrosion as evidenced by surface pitting, embrittlement, and general loss of metal. The metallic surfaces can be composed of high alloy steels, including chrome steels, ferritic alloy steels, austenitic stainless steels, precipitation-hardened stainless steels, and high nickel content steels, but most often the less expensive carbon steels are utilized in combination with corrosion inhibitors or coatings. This problem is even more troublesome in deep-sea operations where replacement of corroded equipment is difficult and costly.

Sea water is a highly corrosive media. When sea water is brought into contact with various metals, such as during transportation of the sea water in metal pipelines, corrosion of the metal can occur. In order to prevent or minimize corrosion, there is a need to eliminate oxygen, which is done by $O_2$ scavengers. Current corrosion inhibitors that are available in the market to treat corrosion caused by acidic species, such as $H_2S$ and/or $CO_2$, cannot effectively treat oxygen corrosion.

In the food/beverage and/or wash/sanitizing industries, solutions, such as sodium hypochlorite solutions, are commonly used and are highly effective as bleaches and sanitizers for cleaning a variety of surfaces. However, sodium hypochlorite solutions are corrosive to many treated surfaces, such as metal surfaces, which can become highly corroded.

In fracturing operations, saltwater disposal wells, formation squeezes, or waterflood operations, oxygen-induced corrosion can be observed in the equipment, especially in tank mixers and agitators. Commonly used corrosion inhibitors in oilfield applications do not provide adequate protection against oxygen-induced corrosion. Additionally, the use of oxygen scavengers proved to be ineffective especially when the level of dissolved oxygen is high in open systems.

There are several mechanisms responsible for corrosion of metals. In corrosive water systems, the overall corrosion rate is controlled by the reduction of oxygen influencing the cathodic reaction. However, the most robust and cost effective water treatment programs include both anodic and cathodic inhibitors to block reactions at both the anode and the cathode.

Anodic inhibitors suppress the rate of metal ions being transferred into the aqueous environment while cathodic inhibitors act through the development of a barrier film that reduces the ability of oxygen to diffuse to the metal surface.

Despite the availability of a variety of corrosion inhibitors, there still exists a need for improved compounds and methods for providing corrosion inhibition, in addition to a need to develop less expensive, high performance corrosion inhibitors, including chemistries that provide environmental benefits, health benefits (e.g., handling and manufacturing), manufacturing energy reduction, and reduction in waste generation.

BRIEF SUMMARY OF THE INVENTION

Corrosion inhibitor compositions are provided that may comprise a mixture of 1) one or more alkaline earth metals, 2) one or more organic phosphates, 3) one or more inorganic phosphates, and 4) hydroxyphosphono acetic acid and/or salts thereof and/or derivatives of hydroxyphosphono acetic acid and/or salts thereof. An example of a derivative of hydroxyphosphono acetic acid is 2-hydroxy-2-phosphono acetic acid.

Methods of mitigating corrosion of metal surfaces, such as metal surfaces of housings and/or conduits, are also disclosed. The methods may include the steps of adding a mixture to a system containing a metal surface, wherein the mixture comprises an effective amount of one or more alkaline earth metals, one or more organic phosphates, and one or more inorganic phosphates, and adding an effective amount of hydroxyphosphono acetic acid and/or salts thereof and/or derivatives of hydroxyphosphono acetic acid and/or salts thereof to the system.

The mixture and/or the hydroxyphosphono acetic acid and/or salts thereof and/or derivatives of hydroxyphosphono acetic acid and/or salts thereof may be added directly to the metal surface and/or to a medium in the system.

In certain aspects, the methods can further include treating the metal surface with an effective amount of a mixture of one or more alkaline earth metals, one or more organic phosphates, and one or more inorganic phosphates before the medium contacts the metal surface and/or treating the metal surface with an effective amount of hydroxyphosphono acetic acid and/or salts thereof and/or derivatives of hydroxyphosphono acetic acid and/or salts thereof before the medium contacts the metal surface.

The foregoing has outlined rather broadly the features and technical advantages of the present disclosure in order that the detailed description of the invention that follows may be better understood. Additional features and advantages of the disclosure will be described hereinafter that form the subject of the claims. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION OF THE INVENTION

The present disclosure provides a treatment including compositions and methods useful for inhibiting corrosion of metal surfaces in contact with systems. The systems may comprise one or more phases. The system may be an aqueous system, for example. The system may be a multiphase system, such as a system comprising water and gas or steam, and, in some embodiments, the system may comprise water, gas or steam, and hydrocarbon (crude oil). A multiphase system may comprise one or more solids, one or more liquids, one or more gasses, and any combination thereof.

The compositions disclosed herein may be applied to systems found in fracturing operations and/or waterflood operations, for example. The compositions may also be applied to saltwater disposal wells, formation squeezes, sea water, downhole, at the well, multiphase flowlines, pre and post separation flowlines, and transport flowlines, for example. In addition to upstream and midstream applications, the compositions disclosed herein may also be applied to any downstream systems, such as systems found at a refinery. For example, the compositions may be applied to a desalter.

This treatment eliminates or reduces the use of an oxygen scavenger and it also eliminates the need to construct degasification facilities.

As used herein, "corrosion inhibitor" is intended to refer to at least one of, or any combination of, the disclosed corrosion inhibitors, corrosion inhibitor intermediates, and corrosion inhibitor product formulations.

In some embodiments, a corrosion inhibitor of the present disclosure can include multiple components. For example, the corrosion inhibitor can include a mixture of any alkaline earth metal, an organic phosphate, an inorganic phosphate, and a hydroxyphosphono acetic acid and/or salts thereof. Additionally, the compositions disclosed herein may include one or more additional corrosion inhibitors, such as alkyl, hydroxyalkyl, alkylaryl, arylalkyl or arylamine quaternary salts; mono or polycyclic aromatic amine salts; imidazoline derivatives; mono-, di- or trialkyl or alkyl phosphate esters; phosphate esters of hydroxylamines; phosphate esters of polyols; monomeric or oligomeric fatty acids; and any combination thereof.

Alkaline earth metals are commonly known in the art. An example of an alkaline earth metal is magnesium. Alkaline earth metals include, but are not limited to, magnesium, calcium, and barium-containing minerals or compounds. In certain aspects, the one or more alkaline earth metals comprise magnesium. The magnesium compound may be magnesium chloride, for example.

The corrosion inhibitor composition may include about 0.1% to about 20% by weight of the one or more alkaline earth metals. For example, the corrosion inhibitor composition may include from about 0.1% to about 15%, from about 0.1% to about 10%, from about 0.1% to about 5%, from about 5% to about 10%, from about 5% to about 15%, or from about 5% to about 20% by weight of the one or more alkaline earth metals. In some aspects, the amount of alkaline earth metals in the composition is about 0.1%, 0.5%, 1%, 2%, 4%, 6%, 8%, 10%, 12%, 14%, 16%, 18%, or 20% by weight. In some aspects, the amount of alkaline earth metals in the composition is about 3% by weight.

Organic phosphates are also commonly known in the art and examples of such are phospheno, phosphono, and phosphonate-containing compounds. Similarly, inorganic phosphates are commonly known in the art. One example includes orthophosphate or $PO_4$.

The corrosion inhibitor composition may include about 0.1% to about 40% by weight of the one or more organic phosphates. For example, the corrosion inhibitor composition may include about 0.1% to about 30%, about 0.1% to about 20%, about 0.1% to about 15%, about 0.1% to about 10%, about 5% to about 15%, about 5% to about 20%, about 5% to about 25%, or about 10% to about 20% of the one or more organic phosphates. In some aspects, the amount of the one or more organic phosphates in the composition is about 0.1%, 0.5%, 1%, 3%, 5%, 10%, 12%, 14%, 16%, 18%, 20%, 22%, 24%, 26%, 28%, or 30% by weight. In some aspects, the amount of the one or more organic phosphates in the composition is about 18% by weight.

The corrosion inhibitor composition may include about 0.1% to about 40% by weight of the one or more inorganic phosphates. For example, the corrosion inhibitor composition may include about 0.1% to about 30%, about 0.1% to about 20%, about 0.1% to about 15%, about 0.1% to about 10%, about 5% to about 15%, about 5% to about 20%, about 5% to about 25%, or about 10% to about 20% of the one or more inorganic phosphates. In some aspects, the amount of the one or more inorganic phosphates in the composition is about 0.1%, 0.5%, 1%, 2%, 4%, 6%, 8%, 10%, 12%, 14%, 16%, 18%, 20%, 22%, 24%, 26%, 28%, or 30% by weight. In some aspects, the amount of the one or more inorganic phosphates in the composition is about 18% by weight.

The corrosion inhibitor of the present disclosure can comprise hydroxyphosphono acetic acid and/or salts thereof. The corrosion inhibitor of the present disclosure can comprise derivatives of hydroxyphosphono acetic acid and/or salts thereof. The hydroxyphosphono acetic acid and/or salts thereof and/or derivatives of hydroxyphosphono acetic acid and/or salts thereof can be present in the corrosion inhibitor composition in amounts ranging from about 0.1% to about 60% by weight. For example, the corrosion inhibitor may comprise from about 0.1% to about 50%, from about 0.1% to about 40%, from about 0.1% to about 30%, from about 0.1% to about 20%, from about 0.1% to about 10%, from about 10% to about 20%, from about 10% to about 30%, from about 10% to about 40%, from about 10% to about 50%, from about 20% to about 30%, or from about 20% to about 40% by weight of hydroxyphosphono acetic acid and/or salts thereof and/or derivatives of hydroxyphosphono acetic acid and/or salts thereof. In some aspects, the hydroxyphosphono acetic acid and/or salts thereof and/or derivatives of hydroxyphosphono acetic acid and/or salts thereof can be present in the corrosion inhibitor composition in amount of about 0.1%, 1%, 2%, 4%, 6%, 8%, 10%, 12%, 14%, 16%, 18%, 20%, 22%, 24%, 26%, 28%, 30%, 32%, 34%, 36%, 38%, 40%, 42%, 44%, 46%, 48%, 50%, 52%, 54%, 56%, 58% or 60% by weight. In some aspects, the amount of the hydroxyphosphono acetic acid and/or salts thereof and/or derivatives of hydroxyphosphono acetic acid and/or salts thereof in the composition is about 30% by weight.

The corrosion inhibitor composition may further include water in an amount of about 0.1% to about 70%, such as from about 0.1% to about 60%, about 0.1% to about 50%, about 0.1% to about 40%, about 0.1% to about 30%, about 0.1% to about 20%, about 10% to about 60%, about 10% to about 50%, about 10% to about 40%, about 20% to about 30%, about 20% to about 40%, about 20% to about 50%, about 20% to about 60%, or about 30% to about 60% by weight of water. In some aspects, the amount of water in the composition is about 0.1%, 0.5%, 1%, 5%, 10%, 15%, 20%, 25%, 27%, 29%, 31%, 33%, or 35% by weight. In some aspects, the amount of water in the composition is about 40%, about 45%, about 50%, about 55% or about 60%.

The presently disclosed corrosion inhibitor can further comprise a dispersant. The dispersant can be, for example, any polymer, copolymer, terpolymer, etc., comprising acrylic acid and/or acrylamide with sulfonated monomers. An example of such a dispersant is a copolymer of acrylic acid/2-acrylamido-2-methylpropane sulfonic acid (AMPS). Another example of such a dispersant is a copolymer of acrylic acid/acrylamide. An additional example of such a dispersant is a terpolymer of acrylic acid/acrylamide/sulfonated acrylamide. All monomer ratios in each of the presently disclosed copolymers or terpolymers are intended to be covered by the present disclosure. In one aspect, the dispersant is a terpolymer comprising acrylic acid/acrylamide/sulfonated acrylamide in a monomer ratio of about 40/about 20/about 40.

Further, the dispersant may comprise one or more quaternary ammonium compounds, such as benzyl-($C_{12}$-$C_{18}$ linear alkyl)-dimethyl-ammonium chloride. Additional, non-limiting examples include alkyl benzyl ammonium chloride, benzyl cocoalkyl($C_{12}$-$C_{16}$)dimethylammonium chloride, dicocoalkyl ($C_{12}$-$C_{16}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, hydrogenated tallow alkyl (2-ethylhyexyl) dimethyl quaternary ammonium methyl sulfate, and any combination thereof.

In some embodiments, the compositions disclosed herein may include one or more surfactants. Suitable surfactants include, but are not limited to, anionic surfactants, cationic surfactants, nonionic surfactants, and combinations thereof.

Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates, and combinations thereof.

Cationic surfactants include alkyl trimethyl quaternary ammonium salts, alkyl dimethyl benzyl quaternary ammonium salts, dialkyl dimethyl quaternary ammonium salts, imidazolinium salts, and combinations thereof.

Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters, and combinations thereof.

Also included are betaines and sultanes, amphoteric surfactants such as alkyl amphoacetates and amphodiacetates, alkyl amphopropripionates and amphodipropionates, alkyliminodiproprionate, and combinations thereof.

In certain embodiments, the surfactant may be a quaternary ammonium compound, an amine oxide, an ionic or non-ionic surfactant, or any combination thereof.

Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhyexyl) dimethyl quaternary ammonium methyl sulfate.

In some aspects, the corrosion inhibitor composition includes magnesium, phosphoric acid, phosphino succinic oligomer, and hydroxyphosphono acetic acid. In some aspects, the corrosion inhibitor composition includes magnesium, phosphoric acid, phosphino succinic oligomer, water, and hydroxyphosphono acetic acid. In some aspects, the corrosion inhibitor composition consists of magnesium, phosphoric acid, phosphino succinic oligomer, water, and hydroxyphosphono acetic acid.

In some aspects, the corrosion inhibitor composition does not include a transition metal. For example, the corrosion inhibitor composition may exclude zinc and/or any other transition metal(s). It has been found that compositions comprising zinc and/or other transition metals, an organic phosphate, an inorganic phosphate, optionally a dispersant, and hydroxyphosphono acetic may form precipitates and become unstable after about a month of forming the composition. If zinc is replaced with other transition metals, such as copper or nickel, precipitation accelerates.

A method of inhibiting corrosion of a metal surface in contact with a medium is provided. The method may include adding an effective amount of a mixture into a medium of a system comprising the metal surface and adding an effective amount of hydroxyphosphono acetic acid and/or salts thereof and/or derivatives of hydroxyphosphono acetic acid and/or salts thereof into the medium. The mixture may include one or more alkaline earth metals, one or more organic phosphates, and one or more inorganic phosphates. The medium may be, for example, a liquid and/or a gas. In some embodiments, the medium is an aqueous medium. In some embodiments, the system is an aqueous system. In some embodiments, the system is a multiphase system.

The mixture and/or hydroxyphosphono acetic acid and/or salts thereof and/or derivatives of hydroxyphosphono acetic acid and/or salts thereof may be added to the medium before it contacts the metal surface, after it contacts the metal surface, while it is in contact with the metal surface, or any combination thereof.

A method of inhibiting corrosion of a metal housing is also provided. The method may include introducing a medium into the metal housing; adding an effective amount of a mixture to the medium; and adding an effective amount of hydroxyphosphono acetic acid and/or salts thereof and/or derivatives of hydroxyphosphono acetic acid and/or salts thereof to the medium. The mixture may include one or more alkaline earth metals, one or more organic phosphates, and one or more inorganic phosphates. The medium may be, for example, a liquid and/or a gas. In some embodiments, the medium is an aqueous medium.

In some embodiments, a medium comprises sea water, frac water, produced water, a gas, and any combination thereof.

In certain aspects, the effective amount of the mixture of one or more alkaline earth metals, one or more organic phosphates, and one or more inorganic phosphates is about 1 ppm to about 1000 ppm and the effective amount of hydroxyphosphono acetic acid and/or salts thereof is about 1 ppm to about 500 ppm. In some aspects, the amount of the mixture and hydroxyphosphono acetic acid added to the aqueous medium is about 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 300 ppm, 400 ppm, 500 ppm, 600 ppm, 700 ppm, 800 ppm, 900 ppm, or more.

In certain aspects of the present disclosure, the treatment can include an initial pretreatment of the metal surface of the system incorporating a pre-passivation step using about 100 ppm of a mixture of alkaline earth metal, such as magnesium, an organic phosphate, and an inorganic phosphate plus about 50 ppm of hydroxyphosphono acetic acid. A medium can be introduced into the metal-containing system. If the medium is an aqueous medium, the pH of the water can optionally be adjusted, such as to about 8.5, using lime, followed by a water treatment step using about 5 ppm of a mixture of alkaline earth metal, such as magnesium, an organic phosphate, and an inorganic phosphate, plus about 2.5 ppm hydroxyphosphono acetic acid and/or derivatives of hydroxyphosphono acetic acid.

For example, a method of mitigating corrosion according to the present disclosure can include providing a metal surface, such as a metallic housing or conduit that will be contacted by a medium. The metal surface can be pretreated with an effective amount of a mixture of one or more alkaline earth metals, one or more organic phosphates, and one or more inorganic phosphates. The metal can also be pretreated with an effective amount of hydroxyphosphono acetic acid and/or salts thereof and/or derivatives of hydroxyphosphono acetic acid and/or salts thereof. After these pretreatment steps, the metal surface may be contacted by a medium. After introduction of the medium, a mixture of an effective amount of one or more alkaline earth metals, one or more organic phosphates, and one or more inorganic phosphates can be added to the medium. Finally, an effective amount of hydroxyphosphono acetic acid and/or salts thereof and/or derivatives of hydroxyphosphono acetic acid and/or salts thereof can be added to the medium. As a result of the presently disclosed methods, corrosion of the metal surface will be mitigated or prevented.

In certain embodiments, the effective amount of the mixture of one or more alkaline earth metals, one or more organic phosphates, and one or more inorganic phosphates in the initial pretreating step is about 100 ppm and the effective amount of hydroxyphosphono acetic acid and/or salts thereof and/or derivatives of hydroxyphosphono acetic acid and/or salts thereof in the initial pretreating step is about 50 ppm.

Moreover, in certain embodiments, the effective amount added to the medium of the mixture of one or more alkaline earth metals, one or more organic phosphates, and one or more inorganic phosphates is from about 1 ppm to about 60 ppm and the effective amount of hydroxyphosphono acetic acid and/or salts thereof and/or derivatives of hydroxyphosphono acetic acid and/or salts thereof added to the medium is from about 2.5 ppm to about 10 ppm.

In certain aspects of the methods disclosed herein, when the medium is an aqueous medium, the pH of the aqueous medium can be adjusted to about 8.5 by adding lime or soda ash thereto.

According to the present disclosure, the selection of the appropriate combination of components, and amounts of components, can be based upon, for example, the type of media causing the corrosion and/or the type of corrosion. In this regard, if the media is alkaline or has a basic pH, one may select a corrosion inhibitor comprising a mixture of any alkaline earth metal, an organic phosphate, an inorganic phosphate, an optional dispersant, and hydroxyphosphono acetic acid and/or salts thereof and/or derivatives of hydroxyphosphono acetic acid and/or salts thereof.

Dissolved phosphates of the present corrosion inhibitor assist in the corrosion inhibition process. However, in an alkaline media, the phosphates can precipitate from the solution and are thus rendered useless for their desired corrosion inhibition purposes. Thus, in an alkaline media, one might choose to include a dispersant in the corrosion inhibitor composition. That is, the corrosion inhibitor can comprise any alkaline earth metal, an organic phosphate, an inorganic phosphate, and hydroxyphosphono acetic acid and/or salts thereof and/or derivatives of hydroxyphosphono acetic acid and/or salts thereof, and a dispersant. The dispersant component will assist in blocking the formation of the undesired phosphate precipitates and will thus allow the phosphates to remain dissolved and perform their function as corrosion inhibitors.

The present inventors have discovered a stable, synergistic combination of a mixture of any alkaline earth metal, an organic phosphate, an inorganic phosphate, optionally a dispersant, and hydroxyphosphono acetic acid and/or salts thereof and/or derivatives of hydroxyphosphono acetic acid and/or salts thereof. If the medium is an aqueous medium, lime or soda ash is useful for increasing the pH. In turn, this will lower the effective amount of the mixture of the alkaline earth metal, the organic phosphate, and the inorganic phosphate necessary to effectively inhibit or prevent corrosion. Thereby, the overall cost of the treatment will be dramatically reduced as soda ash or lime is significantly less expensive than the mixture of alkaline earth metal, organic phosphate, and inorganic phosphate.

One type of unique aqueous media is sea water. This media is dramatically different than other aqueous media, such as municipal water, because it has a large amount of total dissolved solids (TDS), for example. In activities, such as mining, one difficulty that can be encountered is a shortage of water supply. In Chile, in order to overcome this difficulty, some mining companies have proposed to transport water from Pacific Ocean up to the mountains using mild steel pipelines. In such a situation, studies need to be carried out to identify a proper corrosion inhibitor for the sea water media. Due to the complexity and uniqueness of sea water, this is an intensive task. As can be seen from the examples in the present application, all aspects of the presently claimed corrosion inhibitor composition were successful in mitigating, inhibiting and/or preventing corrosion of metals exposed to high TDS brines.

The compositions disclosed herein are effective corrosion inhibitors for many different applications, such as fracturing operations, saltwater disposal wells, formation squeezes, and/or waterflood operations.

Furthermore, different types of corrosion can occur and this can also help determine which components should be included in the corrosion inhibitor. For example, "pitting corrosion," or "pitting," is a localized form of corrosion that causes or develops craters or potentially small holes in the metal. Essentially, the corrosion penetrates deeper and deeper into the metal in a small, localized area, causing loss of metal. The inner surface, or portion of the surface contacting the corrosive media that comprises the pitting, usually becomes anodic, while a potentially large area of the remainder of the inner metal surface becomes cathodic. In cases where the surface to be treated includes pitting, one may choose to include hydroxyphosphono acetic acid and/or salts thereof, in the corrosion inhibitor composition. The hydroxyphosphono acetic acid and/or salts thereof can deposit over, or cover, salts formed in the crater or pit and block further pitting.

As can be seen in the examples disclosed herein, the present inventors have discovered a synergistic combination of ingredients that inhibit or prevent pitting, as well as other types of corrosion. In certain aspects, the synergy is between a mixture of an alkaline earth metal, such as magnesium, an organic phosphate, an inorganic phosphate, and hydroxyphosphono acetic acid and/or salts thereof and/or derivatives of hydroxyphosphono acetic acid and/or salts thereof.

Thus, in one aspect, where pitting corrosion is involved, a corrosion inhibitor composition according to the present disclosure can comprise a mixture of an alkaline earth metal, an organic phosphate, an inorganic phosphate, and hydroxyphosphono acetic acid and/or salts thereof and/or derivatives of hydroxyphosphono acetic acid and/or salts thereof.

The presently disclosed corrosion inhibitor compositions can be added into the systems by any means known in the art. For example, the inhibitor can be injected via a chemical metering pump into the system. Other acceptable methods of injection include pretreating/precoating the metal surfaces before exposure to the corrosive media, continuous injection, or batch treating. Continuous addition/injection may be performed where appropriate chemical injection equipment is available in the field along with chemical storage tanks. Otherwise, the chemical may be treated using a specialized treatment vehicle which applies a large chemical dosage at long time intervals, usually every one to two weeks, and in certain cases, monthly. Batch application may be performed through the use of a treating truck comprising a storage tank containing the corrosion inhibitor(s) (and optionally other chemicals) and a large water tank. The treating truck travels to field locations and treats individual sites.

EXAMPLES

Procedures were set up to test the effectiveness of the presently disclosed corrosion inhibitor compositions in mitigating corrosion in mild steel under aerated synthetic produced water environments. The inventive corrosion inhibitors were also compared to compositions comprising zinc.

The corrosion inhibitor compositions selected for this study were:
A. A mixture of magnesium chloride (about 3% by weight ($MgCl_2$ non-hydrated)), an organic phosphate (phosphinococarboxylate sodium salt) (about 18% by weight), and phosphoric acid (about 17.7% by weight), and hydroxyphosphono acetic acid (about 30% by weight) ("Corrosion Inhibitor 1").
B. A mixture of zinc chloride, an organic phosphate (PSO), and an inorganic phosphate (o-$PO_4$), and hydroxyphosphono acetic acid ("Corrosion Inhibitor 2").
C. A mixture of magnesium chloride (about 7.5% by weight ($MgCl_2$ non-hydrated)), an organic phosphate (phosphinococarboxylate sodium salt) (about 18% by weight), and phosphoric acid (about 17.7% by weight), and hydroxyphosphono acetic acid (about 30% by weight) ("Corrosion Inhibitor 3").

Corrosion Inhibitor 1 is 60% less active on the metal cation than Corrosion Inhibitors 2 and 3.

Figure 1:
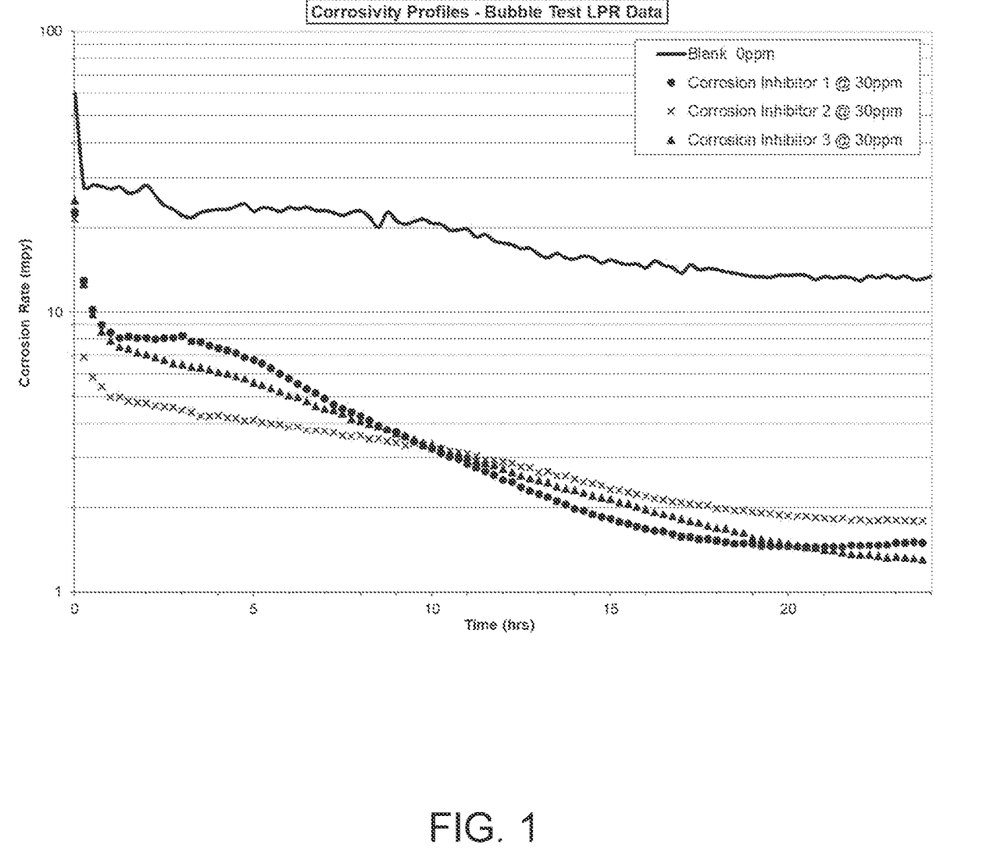
FIG. 1 shows bubble cell test results for various corrosion inhibitor compositions.
Figure 2:
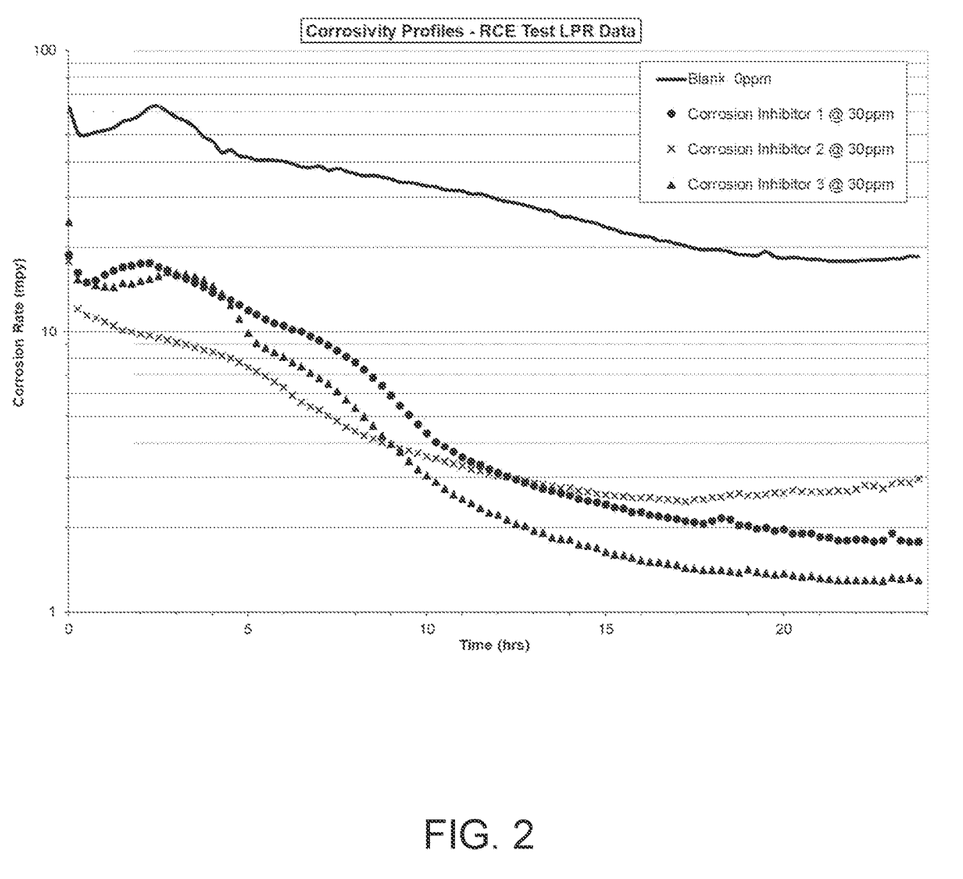
FIG. 2 shows rotating cylinder electrode tests for various corrosion inhibitor compositions.
Figure 3:
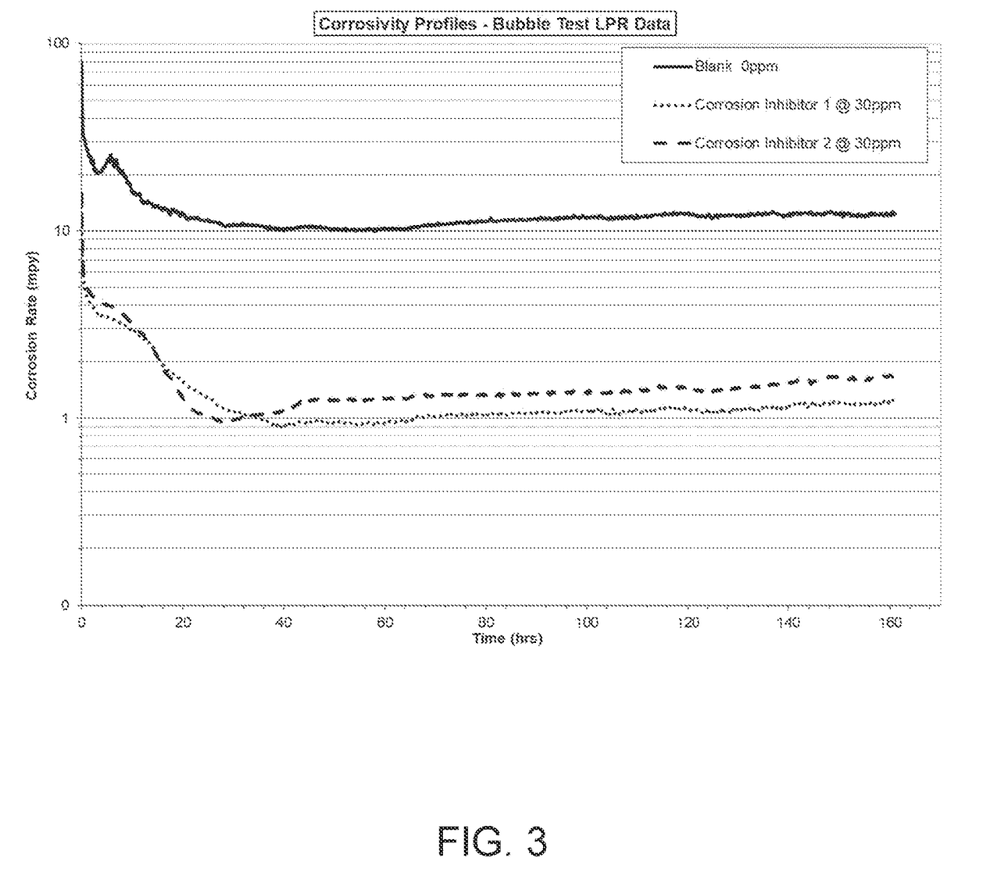
FIG. 3 shows bubble cell test results for various corrosion inhibitor compositions.

Bubble cells (test at low shear) and Rotating Cylinder Electrode (RCE) (test at high shear) were used to prove how the claimed formulations based on alkaline earth metals, such as magnesium, showed better performance than compositions containing zinc. FIGS. 1 to 3 show the bubble cell and RCE test results.

The corrosion rate of mild steel submerged in untreated synthetic produced water (Blank) was compared with values obtained using about 30 ppm dosage of certain presently disclosed corrosion inhibitors (Corrosion Inhibitors 1, 2 and 3) under specific conditions. Corrosion rates were continuously measured using the LPR electrochemical technique. As can be observed in FIGS. 1 to 3, all the datasets show an immediate drop in corrosion rates with the exception of the untreated cell (Blank). It is worth mentioning that the initial drop in corrosion rate shown in cells dosed with Corrosion Inhibitors 1 to 3 was followed by a slow decrease in corrosion rate over time which could mean that the protective film was well established and the electrode surface was passivated. This trend was clearly observed and was more notorious in cells dosed with Corrosion Inhibitors 1 and 3. Corrosion Inhibitors 1 and 3 showed the best corrosion protection performance at about 30 ppm at both low and high shear environments.

Tests were carried out using synthetic produced water prepared according to ASTM D1141. Tubular-shaped test coupons (for the bubble cell tests) and ring-shaped coupons (for the RCE tests) made of C1018 mild carbon steel were used for the electrochemical and weight loss measurements. The test coupons received a surface pretreatment before use. This pretreatment included dipping and sonicating the coupons for about 2 minutes in xylene and about 2 minutes in isopropyl alcohol to remove any residual, oily substances. The test coupons were then dried with nitrogen.

All experiments for corrosion rate measurement, as well as for corrosion inhibitor selection, were carried out using linear polarization resistance technique (LPR). LPR is one of the most commonly used methods to measure corrosion rate. It is a DC electrochemical technique and is typically based on the imposition of a small voltage to the electrodes, (−10 mV to +10 mV) around the Open Circuit Potential (OCP). If the potential is raised above the free corrosion potential (Ecorr), the metal dissolution rate will increase. Conversely, if the potential is lowered, the rate will decrease. The LPR technique assumes that the exponential anodic (i.e., potential above Ecorr), and the cathodic (i.e., potential below Ecorr) polarization curves approximate to a straight line close to the free corrosion potential (OCP).

The corrosion rate can then be derived from the theoretical Stern and Geary$^2$ analysis of polarization curves and Faraday's Law.

Another way to follow corrosion rate is through mass loss balance. This technique is suitable for both generalized and localized corrosion and can be described as follows. The tubular and ring-shaped test coupons received a surface treatment after each electrochemical experiment in order to remove any corrosion product eventually deposited on the surface before being weighed. The test coupons were copiously rinsed with water, smoothly brushed, and then immersed into concentrated hydrochloric acid for about 5 seconds. Finally, the test coupons were copiously rinsed with distilled water, dried, and weighed.

Once the corrosion rate (CR) is known for a specific sample of water, corrosion inhibitor performance can be evaluated. Measurement of weight loss along with instantaneous electrochemical corrosion using LPR was carried out keeping the rotating electrode at about 2000 rpm for RCE (high shear) and the solution about 100 rpm for bubble cell (low shear). The assays were carried in the presence or absence of a corrosion inhibitor. The percent protection relative to blank samples can be determined for each chemical according to the following equation:

Efficiency of inhibition (%)=((CR−$CR_{CI}$)×100)/CR, wherein CR is the corrosion rate without any treatment and $CR_{CI}$ is the corrosion rate determined in the presence of a corrosion inhibitor.

Diagnosis between localized (pitting) and general corrosion can be accomplished through surface examination before and after each test. This exam was recorded using a digital camera and optical microscopy with 10× magnification lens. This qualitative method is extremely useful to evaluate the performance of corrosion inhibitors, especially when localized corrosion or pitting is taking place. Visual examination of the surfaces of the test coupons/electrodes can indicate the presence of localized or pitting corrosion that otherwise would not be detected by LPR or mass loss balance techniques.

In a set of tests (low and high shear), the coupon surface, which was submerged into untreated synthetic produced water, presented clear signals of general and localized corrosion. The use of Corrosion Inhibitors 1 and 3 was very effective to prevent both generalized and localized corrosion at about 30 ppm. Corrosion Inhibitor 2 showed good performance against generalized corrosion but did not present completely satisfactory results against localized corrosion. This proves the need of pH adjustment for the Zn based formulation (Corrosion Inhibitor 2) to protect against localized corrosion. The adjustment of pH is optional in the event of using Mg-based formulations (Corrosion Inhibitors 1 and 3). These results are in agreement with bubble cell and RCE results (FIGS. 1 to 3).

In an additional experiment, samples of Corrosion Inhibitors 1 and 2 were placed in separate jars and allowed to stand for 30 days. Subsequent visual inspection of the jars showed that precipitation had formed in the jar containing Corrosion Inhibitor 2 whereas no precipitant formed in the jar containing Corrosion Inhibitor 1. The same experiment was performed with Corrosion Inhibitors 2 and 3 and no precipitant was formed in the jar containing Corrosion Inhibitor 3 while precipitation once again formed in the jar containing Corrosion Inhibitor 2.

Further experiments were carried out using formulations similar to Corrosion Inhibitor 2 but in a first trial, zinc was replaced with copper and in a second trial, zinc was replaced with nickel. Each of these formulations showed precipitation after only about 3 days, thereby proving that the inventive formulations, having alkaline earth metals as opposed to transition metals, are highly stable.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of inhibiting corrosion of a metal surface in contact with a medium, comprising:
    adding an effective amount of a mixture into the medium, the mixture comprising:
        one or more alkaline earth metals at a concentration of about 3% to about 20% by weight,
        water at a concentration of about 0.1% to about 70% by weight,
        one or more organic phosphates at a concentration of about 0.1% to about 40% by weight, and
        one or more inorganic phosphates at a concentration of about 0.1% to about 40% by weight; and
    adding an effective amount of hydroxyphosphono acetic acid and/or salts thereof and/or derivatives of hydroxyphosphono acetic acid and/or salts thereof into the medium,
    wherein the one or more alkaline earth metals comprises magnesium at a concentration of about 3% to about 20% by weight.

2. The method of claim 1, wherein the effective amount of the mixture is from about 1 ppm to about 1000 ppm or about 1 ppm to about 100 ppm.

3. The method of claim 1, wherein the effective amount of the hydroxyphosphono acetic acid and/or salts thereof and/ or derivatives of hydroxyphosphono acetic acid and/or salts thereof is from about 1 ppm to about 500 ppm or from about 1 ppm to about 50 ppm.

4. The method of claim 1, wherein the method is carried out during a process selected from the group consisting of an oil production process, a gas production process, and any combination thereof.

5. The method of claim 1, wherein the one or more organic phosphates comprises phosphino succinic oligomer (PSO).

6. The method of claim 1, further comprising adding a dispersant, wherein the dispersant is selected from the group consisting of polymers of acrylic acid with sulfonated monomers, copolymers of acrylic acid with sulfonated monomers, copolymers of acrylic acid and acrylamide, polymers of acrylamide with sulfonated monomers, copolymers of acrylamide with sulfonated monomers, a quaternary ammonium compound, and any combination thereof.

7. The method of claim 6, wherein the dispersant is selected from the group consisting of a copolymer of acrylic acid and 2-acrylamido-2-methylpropane sulfonic acid, a copolymer of acrylic acid and acrylamide, a terpolymer of acrylic acid, acrylamide, and sulfonated acrylamide, and any combination thereof.

8. The method of claim 1, wherein a transition metal is not added to the medium.

9. The method of claim 1, wherein the mixture and the hydroxyphosphono acetic acid and/or salts thereof and/or derivatives of hydroxyphosphono acetic acid and/or salts thereof are added to or during one or more of a fracturing operation, a waterflood operation, a saltwater disposal well, a formation squeeze, sea water, a subterranean formation, multiphase flowlines, pre-separation flowlines, post-separation flowlines, transport flowlines, a refining process, and a desalter.

10. The method of claim 1, further comprising pretreating the metal surface prior to the metal being contacted by the medium with an effective amount of a mixture comprising:
   one or more alkaline earth metals,
   water,
   one or more organic phosphates, and
   one or more inorganic phosphates; and
   an effective amount of hydroxyphosphono acetic acid and/or salts thereof and/or derivatives of hydroxyphosphono acetic acid and/or salts thereof.

* * * * *